United States Patent
Fang

(10) Patent No.: US 9,637,670 B2
(45) Date of Patent: May 2, 2017

(54) APPLICATOR WITH HYDROPHOBIC COATING TRANSFERABLE TO CONTACTING SURFACE

(71) Applicant: Illinois Tool Works, Inc., Glenview, IL (US)

(72) Inventor: Jiafu Fang, Spring, TX (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/202,741

(22) Filed: Mar. 10, 2014

(65) Prior Publication Data

US 2016/0222266 A1    Aug. 4, 2016

Related U.S. Application Data

(62) Division of application No. 13/662,970, filed on Oct. 29, 2012, now Pat. No. 9,540,552.

(51) Int. Cl.
*C09K 3/18* (2006.01)
*B60S 1/38* (2006.01)
(Continued)

(52) U.S. Cl.
CPC .......... *C09K 3/18* (2013.01); *B05C 1/02* (2013.01); *B05D 7/02* (2013.01); *B60S 1/02* (2013.01); *B60S 1/38* (2013.01); *C03C 17/30* (2013.01); *C10M 169/044* (2013.01); *B60S 2001/3829* (2013.01); *C03C 2217/76* (2013.01); *C03C 2218/10* (2013.01); *C10M 2201/041* (2013.01); *C10M 2201/061* (2013.01); *C10M 2201/066* (2013.01); *C10M 2201/087* (2013.01);
(Continued)

(58) Field of Classification Search
CPC ...................................................... C09K 3/18
See application file for complete search history.

(56) References Cited

U.S. PATENT DOCUMENTS 2,877,201 A   3/1959   Bonza et al.
3,972,850 A   8/1976   Hamilton et al.
(Continued)

FOREIGN PATENT DOCUMENTS

CN   1726250 A   1/2006
JP   201262337 A   3/2012
(Continued)

*Primary Examiner* — William P Watkins, III
(74) *Attorney, Agent, or Firm* — Avery N. Goldstein; Blue Filament Law PLLC

(57) ABSTRACT

A coating composition for imparting a hydrophobic film on a target surface is provided that includes an oil of a silicone oil or a fluoropolymer oil or a combination thereof, a resin, and a dry lubricant. A solvent is present to form a solution of the oil and resin. A coating is imparted to an applicator that in turn can transfer the coating as a hydrophobic film. The coating composition is stable and able to impart hydrophobic film even after storage for several weeks at elevated temperature. The coating composition does so through the exclusion of synthetic waxes especially including silicone waxes. A kit is also provided that includes a wiper blade having the above coating composition applied along with instructions for the securement of the wiper blade to a vehicle to impart the hydrophobic film to a vehicle windshield contacted by the wiper blade.

16 Claims, 2 Drawing Sheets

(51) Int. Cl.
  *C03C 17/30* (2006.01)
  *C10M 169/04* (2006.01)
  *B60S 1/02* (2006.01)
  *B05C 1/02* (2006.01)
  *B05D 7/02* (2006.01)

(52) U.S. Cl.
  CPC ... *C10M 2213/00* (2013.01); *C10M 2213/003* (2013.01); *C10M 2213/062* (2013.01); *C10M 2229/02* (2013.01); *C10M 2229/041* (2013.01); *C10M 2229/0415* (2013.01); *C10M 2229/0475* (2013.01); *C10N 2220/022* (2013.01); *C10N 2220/082* (2013.01); *C10N 2230/26* (2013.01); *C10N 2230/40* (2013.01); *C10N 2250/121* (2013.01)

(56) References Cited

U.S. PATENT DOCUMENTS

| | | | |
|---|---|---|---|
| 4,622,712 A | 11/1986 | Sugita et al. | 15/250.48 |
| 4,978,463 A | 12/1990 | Satoji | 508/304 |
| 5,134,021 A | 7/1992 | Hosono et al. | |
| 8,052,271 B2 | 11/2011 | Kunimine et al. | |
| 8,258,219 B2 | 9/2012 | Shimada et al. | |
| 2005/0252812 A1* | 11/2005 | Lewis | B65D 75/225 206/461 |
| 2006/0293183 A1 | 12/2006 | Kenney et al. | |
| 2009/0011244 A1 | 1/2009 | Kishikawa et al. | |
| 2009/0047475 A1 | 2/2009 | Jeon | 428/145 |
| 2010/0234489 A1 | 9/2010 | Shimada et al. | 523/169 |
| 2013/0045332 A1 | 2/2013 | Fang | B32B 25/20 427/358 |

FOREIGN PATENT DOCUMENTS

| | | | |
|---|---|---|---|
| KR | 10-2005-0006677 | 1/2006 | |
| WO | 2011102939 A1 | 8/2011 | |
| WO | WO 2011102939 A1 * | 8/2011 | B32B 25/20 |

\* cited by examiner

APPLICATOR WITH HYDROPHOBIC COATING TRANSFERABLE TO CONTACTING SURFACE

RELATED APPLICATIONS

This application is a divisional application of U.S. Nonprovisional application Ser. No. 13/662,970 filed Oct. 29, 2012; the contents of which is hereby incorporated by reference.

FIELD OF THE INVENTION

The present invention in general relates to a hydrophobic coating composition and in particular to a wiper blade imparting a hydrophobic film to a contacted window through wiper usage.

BACKGROUND OF THE INVENTION

Rain, sleet, and snow have always presented a vision problem for the operator of a vehicle. While mechanical movement of a wiper blade across a windshield is partly effective as a mechanical squeegee to displace water and snow from a windshield. The operation of a conventional wiper blade, regardless of whether made of carbon-base or silicone rubbers, is only partially effective in clearing water and snow from a windshield. A wiper blade moving across a windshield leaves a thin film of water that partly impairs vision and promotes adhesion of additional liquid water or snow to the windshield. Additionally, as a wiper blade undergoes degradation through exposure to the environment, the uniformity of wiper blade contact with the windshield is degraded. Additionally, debris that commonly adheres to the windshield creates regions in which wiper blade is gapped from the windshield surface leading to vision obscuring streaks and water droplets.

To address limitations of windshield cleaning through mechanical squeegee action, hydrophobic glass treatment solutions have been applied to automotive windshields to improve driver vision under high humidity conditions of rain, sleet, or snow. Representative of such glass treatments are those detailed in U.S. Pat. Nos. 3,579,540, 5,688,864, 6,432,181. While such glass treatments are effective in rendering the windshield hydrophobic so as to cause water to bead and not form windshield water film, these products have met with limited acceptance owing to the labor-intensive application, and somewhat toxic chemicals needed to be handled to create a hydrophobic windshield surface. Additionally, the application of such hydrophobic glass treatments while a windshield is being subjected to rain or other precipitation is impractical.

In recognition of the limitations of conventional hydrophobic glass treatments, coating compositions have been developed for a wiper blade that include a silicone wax, a silicone oil in a solid lubricant such that the wax dissolves in the silicone oil such that during operation of the wiper blade, components of the coating layer are transferred onto a contacting windshield through the friction of the wiper blade against the windshield. Such a composition is detailed in U.S. 2010/0234489. While such a coated wiper blade is effective in delivering a hydrophobic coating to a windshield upon wiper blade installation, the ability of the coating to be transferred to the windshield is rapidly degraded to the point where the ability to transfer coating components to a windshield significantly diminish in the time between wiper production and the actual installation of the blade on a vehicle. Additionally, the coatings imparted to a windshield tend to be irregular and create a mottled hydrophobicity.

Thus, there exists a need for a wiper blade coating that has a long-lasting shelf life after application to the wiper blade as to allow the coated wiper blade to impart a hydrophobic film to the contacted areas of the windshield rapidly during wiper blade operation and even after a long storage duration of wiper blade coating composition, and even at elevated temperature. There further exists a need for a process of applying an inventive coating composition to a wiper blade and the subsequent transfer of coating composition components to a contacted windshield.

SUMMARY OF THE INVENTION

A coating composition suitable for application to an applicator, such as a wiper blade is provided that includes a silicone oil or mixture of silicone oils having an overall viscosity ranging from 2 square millimeters per second ($mm^2/s$) to one million ($mm^2/s$) at 25° C., a silicone resin, and a dry lubricant with a particle size of smaller than 100 microns. In some specific embodiments, a solvent distinct from the silicone oil is present to help dissolve the silicone oil and the silicone resin to form a solution. A dry lubricant or mixture of dry solid lubricants is added to the solution to form a wiper blade coating composition. a hydrophobic film to a contacted windshield. The coating composition is stable and a wiper blade squeegee coated with such a composition is able to impart a hydrophobic film to the windshield even after storage for several weeks or months at elevated temperature. The coating composition is also provided that excludes silicone waxes and agents for crosslinking of the silicone oil.

An improved coating composition for the application of a hydrophobic film to the contacted target surface is provided with the coating composition suitable for application to a wiper blade, the improved coating composition includes a silicone oil, a silicone resin and a dry lubricant wherein the improvement lies in being dissolved in the case of the silicone oil and the silicone resin, and suspended in the case of the dry lubricant in a solvent. It is appreciated that a more environmentally friendly option is to limit the use of, or even exclude a solvent with the silicone oil also functioning as a carrier. A kit is also provided that includes an applicator, the above coating composition, along with instructions for imparting a hydrophobic film to a target substrate such as windshield of a vehicle contacted by a wiper blade applicator.

A process of activating a windshield is also provided that includes contacting the windshield with a wiper blade coated with the coating composition. By wiping the windshield under wet, dry, or a combination of wet and dry conditions; a water repellency of more than 60 degrees of water contact angle is achieved within 2000 wipe cycles.

BRIEF DESCRIPTION OF THE DRAWINGS

The present invention is further detailed with respect to the following drawing. This figure is not intended to limit the scope of the present invention but rather illustrate certain attributes thereof.

DESCRIPTION OF THE INVENTION

Figure 1:
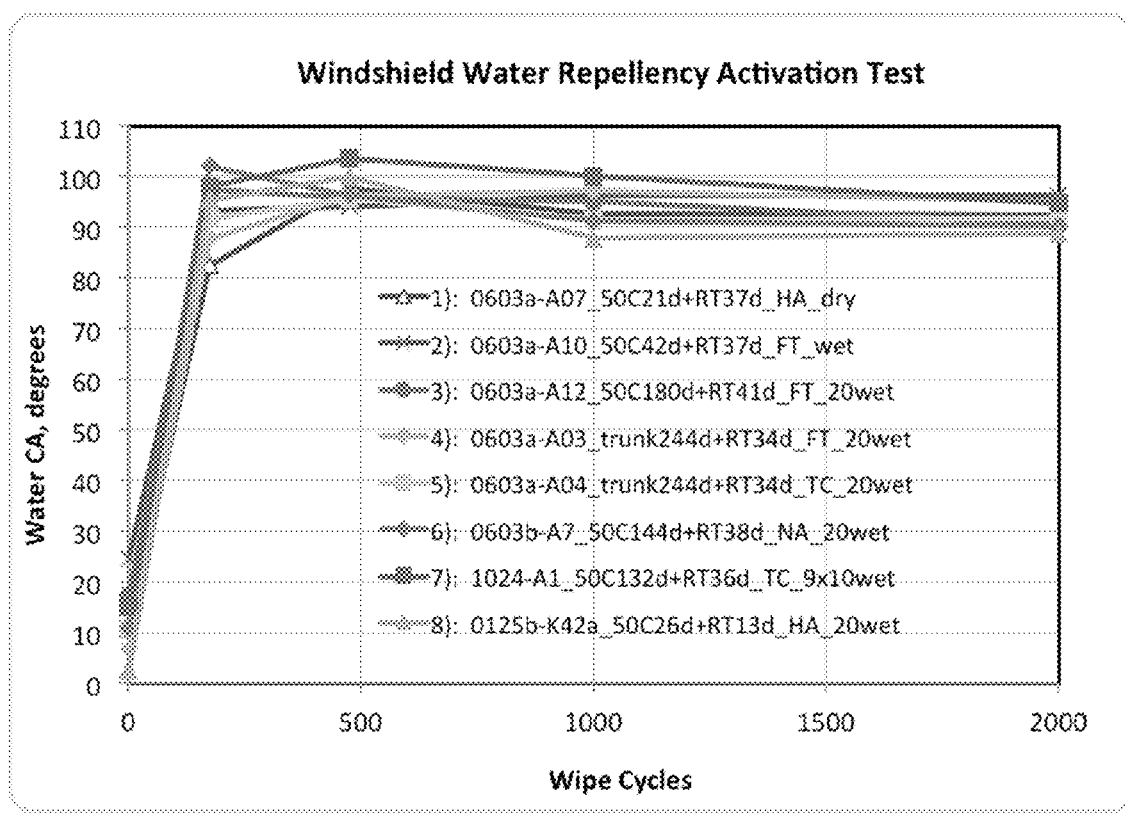
FIG. 1 is a plot of water contact angle in degrees as a function of wiper blade wipe cycles on automotive windshield glass for inventive compositions under various storage and application conditions.

The present invention has utility as a vehicle windshield wiper having a coating that imparts a hydrophobic film to the contacted glass surface. While the present invention is largely detailed with respect to windshields, it is appreciated that other suitable target surfaces of usage for the present invention illustratively include manual squeegees, vehicle rear windows, aircraft exterior surfaces, and other exterior surfaces where water repellency is desired. The present invention has the attribute of long term storage stability coupled with the ability to even after storage, impart a hydrophobic film to a contacted surface. While the present invention largely details the inventive coating composition as being applied to a surface via a wiper blade, it should be appreciated that an inventive coating composition is readily applied to a surface on which a hydrophobic film is desired with resort to other applicators illustratively including a buffing pad or cloth.

An inventive coating composition includes a silicone oil that is liquid at 20° C. It is appreciated that a silicone oil operative herein readily includes a mixture of oils that vary in molecular weight, monomer subunits, or a combination thereof. A silicone oil operative in the present invention is a polydialkylsiloxane having a formula:

where $R^1$ and $R^2$ are in each occurrence independently H, $C_1$-$C_{10}$ alkyl, a substituent containing $C_1$-$C_{10}$ alkyl, $C_6$-$C_{12}$ aryl, or a substituent containing $C_6$-$C_{12}$ aryl; and M is an integer value of from 2 to 2230. A substituent is an alkyl or aryl in which a proton thereon is replaced with a moiety illustratively including hydroxyl, amino, fluorine, or vinyl. Perfluoro silicone oils are also explicitly noted as being operative in an inventive coating composition. While the amount of silicone oil present in an inventive coating composition varies somewhat based on operating use conditions, a silicone oil component is chosen to have a viscosity of from between 2 and 1,000,000 mm²/s at 25° C. and a surface tension of less than 30 dynes per centimeter (dynes/cm). A silicone oil is typically present in certain embodiments from 1 to 95 total weight percent of a coating composition and in still other embodiments from 10 to 60 total weight percent of an inventive coating composition. An exemplary oil component of an inventive coating composition includes a silicone oil. Specific silicone oils operative herein illustratively include polydimethylsiloxane, decamethylcyclopentasiloxane, methylphenylpolysiloxane, methylhydrogenpolysiloxane, amino-functional polydimethylsiloxane, octamethyltrisiloxane, decamethyltetrasiloxane, carboxyl-functional polydimethylsiloxane, carbinol-functional polydimethylsiloxane, phenol-functional polydimethylsiloxane, fluoro-functional polydimethylsiloxane, epoxy-functional polydimethylsiloxane, alkyl-functional polydimethylsiloxane, polyether-functional polydimethylsiloxane, and combinations thereof.

An inventive coating composition also includes a silicone resin soluble in a solvent along with the oil component or in the silicone oil component alone. A silicone resin is chosen such that upon being applied to a substrate promotes formation of a hydrophobic film thereon. Resins operative herein illustratively include a resin component of an inventive coating composition illustratively includes a, silicone-modified urethane resin, silicone-modified epoxy resin, silicone resin, perfluoro-silicone resin, a partially fluorinated silicone resin, $C_1$-$C_6$ alkyl-modified silicone resin, phenyl-modified silicone resin, silicone-modified acrylic resin, and combinations thereofIt is appreciated that high lubricity and hydrophobicity are desirable characteristics of a resin or resin combination in an inventive coating composition. Equally important, the chosen resin is highly soluble in the silicone oil.

In other embodiments of the present invention, the resin is a silicone resin. It should be appreciated that a combination of resins that vary in molecular weight, chemical structure, or a combination thereof are also operative herein. A resin is typically present in an inventive composition in an amount of from 0 to 80 total weight percent while in other embodiments of the present invention, the resin is present from 2 to 40 total weight percent.

An inventive coating composition includes a solvent or a combination of solvents capable of forming a solution with a silicone oil and resin components of an inventive coating composition. The solvents operative herein illustratively include solvents suitable for dissolution of the silicone oil and resin operative illustratively include methylethylketone $C_1$-$C_8$ alkyl lactates, toluene, xylene, $C_1$-$C_8$ alkyl benzenes, $C_1$-$C_8$ alkyl acetates, $C_2$-$C_8$ alcohols, as well as combinations thereof. It is appreciated that the term "alkyl" is used herein is intended to include linear, branched, and cyclic forms thereof. The nature of the solvent as operative herein is largely limited only to the ability to dissolve the silicone oil and the resin components. As will be made clear from the following description, as the inventive composition is applied to an applicator certain embodiments in the controlled environment, solvent evaporation to form a nonvolatile form as a layer adhered to the applicator, in such embodiments the solvent is amenable to capture and in specific embodiments to recycle.

Still another embodiment of an inventive coating composition contains no solvent; and thhe silicone oil alone is capable of forming a solution with the silicone resin component.

An inventive coating composition also includes a particulate lubricant. A particulate lubricant according to the present invention is either applied separately to an applicator or as a colloidal dispersion in the solvent along with the resin and silicone oil components or in the silicone oil-silicone resin mixture without a solvent. The particulate lubricant in certain embodiments of the present invention has greater than 90 particle number percent of the particulate having a particle size smaller than 100 microns as determined by size guide number (SGN). In still other embodiments of the present invention, 100 particle number percent are smaller than 100 microns. In still other embodiments of the present invention, the particulate has a mean particle size smaller than 50 microns. In certain embodiments of the present invention, a coating composition in solvated form is 0.5 to 30 total weight percent particulate lubricant and from 1 to 60 weight percent after the composition is dried to a nonvolatile form on an applicator or if no solvent is used. A particulate lubricant operative in the present invention illustratively includes graphite, turbostratic carbon, boron nitride, boric acid, polytetrafluoroethylene (PTFE), molybdenum disulfide ($MoS_2$), synthetic polymeric materials, and combinations thereof.

An inventive coating composition has superior storage stability as a nonvolatile layer on an applicator such as a wiper blade through the exclusion of silicone waxes, as well as curing agents and/or curing catalysts operative to cross link the oil component. An inventive coating composition is applied to an applicator such as a wiper blade, cloth, or buffing pad and allowed to dry to a nonvolatile layer on the applicator. As an inventive composition is independent of silicone waxes and cure active substances functioning to cross link the oil or resin component, the layer coated applicator according to the present invention is amenable to storage for weeks or months even at extreme temperatures within the range of −50 to 120° C. yet is still able to impart a hydrophobic film to a contacted surface. The resultant film imparts to the surface a water contact angle of more than 80° through simply rubbing the applicator against the target surface.

Figure 2:
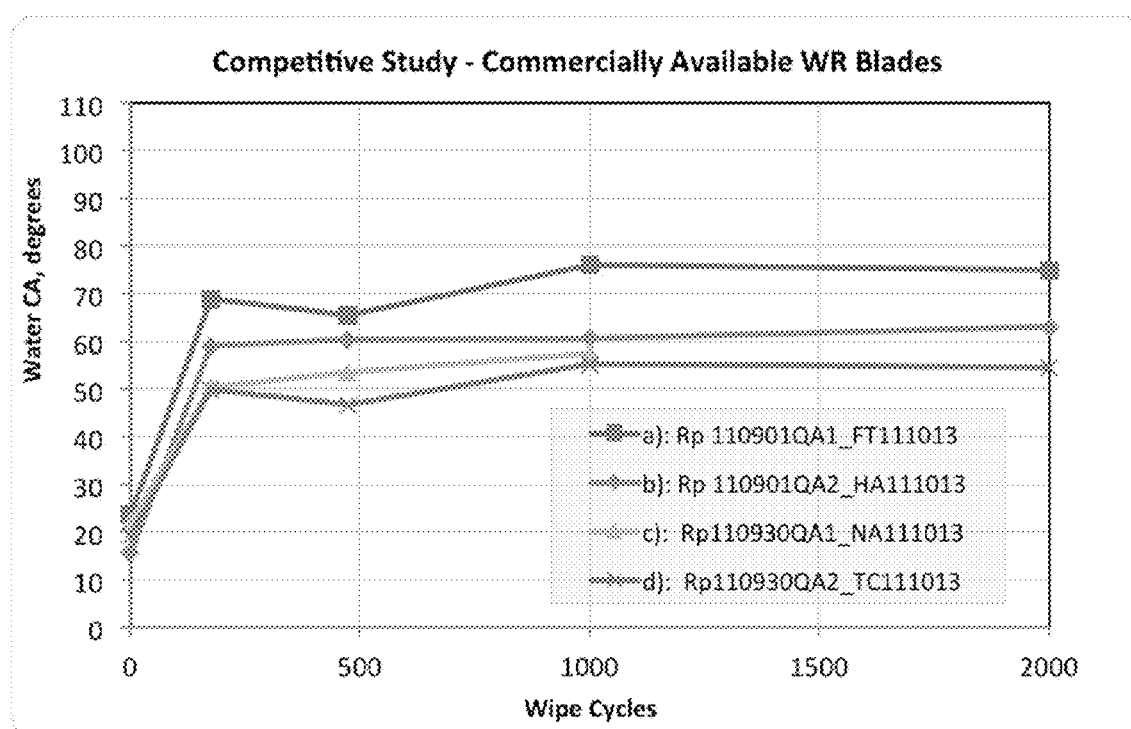
FIG. 2 is a plot of water contact angle in degrees as a function of wipe cycles for various commercially available water repellency wiper blades where reduced contact angle is consistently noted relative to the inventive compositions of FIG. 1.

Without intending to be bound by a particular theory, conventional formulations inclusive of agents for crosslinking and of silicone waxes coated on the applicator surface are ineffective in imparting hydrophobicity onto a contacted/wiped glass surfaces, as illustrated in FIG. 2. The nonvolatile coating composition layer is readily applied to an applicator such as a wiper blade, buffing pad, sponge, or cloth, through conventional techniques such as spray application, dip coating, or brush coating. The typical thickness of a nonvolatile layer of inventing coating composition on an applicator is between 2 and 500 microns although it should be appreciated that thicknesses of coating composition layer absent volatile solvent and other components are readily formed through repeated dosing of the applicator to achieve greater thickness layers or greater dilution of non-volatile components within a solvent so as to achieve reduced thickness layers.

The present invention also provides a kit for producing a hydrophobic film on a surface. The kit includes an applicator having a nonvolatile layer of the coating composition adhered to the applicator, or the coating composition in a separate bottle for user application to the applicator; along with instructions for contacting the coated applicator with the target surface to produce a hydrophobic film on the surface with a water droplet contact angle of greater than or equal to 80° with the contact angle being measured by ASTM C813. The kit in order to have a storage stability of greater than one month, and in certain embodiments more than three months, at an average temperature of between −50° and 120° C. and lacks silicone waxes, as well as curing agents and/or curing catalysts operative to cross link the oil component that precluded the storage stabilities of the present invention. In specific embodiments, the kit includes a protective cover to limit physical contact between the applicator surface on which the nonvolatile layer of the coating composition is present from undesired transfer of the layer during handling, assembly, installation, shipping, storage, prior to contact with the target surface.

A process for activating a windshield with a wiper blade applicator according to certain embodiments of the present invention is achieved by wiping the windshield under wet, dry, or a combination of wet and dry conditions to a water repellency of more than 60 degrees of water contact angle within 2000 wipe cycles. In still other embodiments, this degree of water repellency is achieved while maintaining a wipe quality that is within 90% or greater of that for an uncoated wipe blade otherwise identical to said wiper blade while the water repellency on the wiped windshield surface remains. Wipe quality is typically graded from a scale of 1 to 10, as defined, for example, by Akron Rubber Development Laboratory (ARDL), Inc.

An inventive composition formulation and nonvolatile layer formed therefrom are summarized in Table 1.

TABLE 1

Inventive coating composition formulation and layer formed therefrom.

| Component | Solvated total wt % | Non-volatile total wt. % |
| --- | --- | --- |
| Oil (silicone or fluoropolymer) | 1-95 | 2-90 |
| Resin | 0.1-70 | 1-80 |
| Particulate lubricant | 0.1-45 | 0.5-50 |
| Solvent | 0-remainder | trace to nil |

The present invention is further detailed with respect to the following nonlimiting examples. These examples are not intended to limit the scope of the invention but rather highlight properties of specific inventive embodiments and the superior performance thereof relative to comparative examples.

EXAMPLES 1-4

Table 2 shows several exemplary inventive coating compositions with amounts in total solvated form weight percent.

| Component | Solvent | Polydimethyl Siloxane, 10 cSt | Polydimethyl Siloxane, 100 cSt | Polydimethyl Siloxane, 1000 cSt | Polydimethyl OH-terminated 100 cSt | Silicone Resin | Graphite Powder, av size 5 *m | PTFE av size 8 *m |
| --- | --- | --- | --- | --- | --- | --- | --- | --- |
| Example 1 | 70.0 | 10.0 | 10.0 | 5.0 | | 5.0 | 5.0 | |
| Example 2 | 65.0 | 10.0 | 10.0 | | | 5.0 | 5.0 | |
| Example 3 | 70.0 | | | | 20.0 | 5.0 | 5.0 | |
| Example 4 | 65.0 | 10.0 | 10.0 | 5.0 | | 5.0 | 5.0 | 2.0 |

Test Data

The coating compositions of the given examples are spray-coated on chloroprene rubber-natural rubber (CR—NR) blended squeegees and the coated squeegees are aged at various temperatures for various periods of time before WR activation test. The test results are shown in FIG. 1, where Curve 1 through Curve 5 are obtained for Example 1, Curve 6 for Example 2, Curve 7 for Example 3, and Curve 8 for Example 4.

Curve 1): The coated squeegee is aged at room temperature for 37 days and at 50° C. for 21 days. The windshield WR activation test is run under dry condition on a 2003 Honda Accord test buck. The average water CA on the windshield increased from below 30 degrees before activation to more than 80 degrees after 175 wipe cycles. There are 10 CA measurements across the wiped areas for each average CA data point.

Curve 2): The coated squeegee is aged at room temperature for 37 days and at 50° C. for 42 days. The windshield WR activation test is run under wet condition on a 2000 Ford Taurus test buck. Similarly, the blade is able to activate the windshield quickly and fully.

Curve 3): The coated squeegee is aged at room temperature for 41 days and at 50° C. for 180 days. The windshield WR activation test is run for 20 cycles under wet condition and then for 155 cycles under dry condition on a 2000 Ford Taurus test buck. Similarly, the blade is able to activate the windshield quickly and fully.

Curve 4): The coated squeegee is aged at room temperature for 34 days and then is placed in a sedan's trunk for 244 days. The trunk's temperature during these 244 days fluctuated between no lower than −5 to about 60° C. The windshield WR activation test is run for 20 cycles under wet condition and then for 155 cycles under dry condition on a 2000 Ford Taurus test buck. Similarly, the blade is able to activate the windshield quickly and fully.

Curve 5): The coated squeegee is aged at room temperature for 34 days and then is placed in a sedan's trunk for 244 days. The trunk's temperature during these 244 days fluctuated between no lower than −5 to about 60° C. The windshield WR activation test is run for 20 cycles under wet condition and then for 155 cycles under dry condition on a 2004 Toyota Camry test buck. Similarly, the blade is able to activate the windshield quickly and fully.

Curve 6): The coated squeegee is aged at room temperature for 38 days and at 50° C. for 144 days. The windshield WR activation test is run for 20 cycles under wet condition and then for 155 cycles under dry condition on a 2006 Nissan Altima test buck. Similarly, the blade is able to activate the windshield quickly and fully.

Curve 7): The coated squeegee is aged at room temperature for 36 days and at 50° C. for 132 days. Using a 2006 Nissan Altima test buck, the windshield WR activation test is run for 10 wet cycles followed by 10 dry cycles and this alternating wet-dry step is repeated 9 times. Similarly, the blade is able to activate the windshield quickly and fully.

Curve 8): The coated squeegee is aged at room temperature for 13 days and at 50° C. for 26 days. The windshield WR activation test is run for 20 cycles under wet condition and then followed by 155 cycles under dry condition on a 2003 Honda Accord test buck. Similarly, the blade is able to activate the windshield quickly and fully.

COMPARATIVE EXAMPLES

Commercially available CR—NR blended squeegees are coated with composition corresponding to Examples 1-3 of US2010/0234489 A1 and are aged at room temperature for about 3 months after production. The windshield WR tests show that these coatings are not able to activate the windshield to a water CA of more than 80 degrees, as shown in FIG. 2. The water repellency of the wiped area is observed to not be uniform, indicative that the wiped area of the windshield is not fully activated.

Patents and publications mention the specification are indicative of the levels of those skilled in the art to which the invention pertains. These patents and publications are incorporated herein by reference to the same extent as if each individual patent or publication is specifically and individually incorporated herein by reference.

The forgoing description is illustrative of particular embodiments of the invention, but is not meant to be a limitation upon the practice thereof. The following claims, including all equivalents thereof are intended to define the scope of the invention.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

The invention claimed is:

1. A kit for producing a hydrophobic film on a vehicle window surface, the kit comprising:
    an applicator having an applicator surface;
    a nonvolatile layer formed from a composition comprising: an oil selected liquid at 20° C. from a group consisting of a silicone oil, fluoropolymer oil, and a combination thereof; a resin soluble in said oil; and a particulate lubricant; the composition being free of all of: a silicone wax, a curing agent, and a curing catalyst operative to cross link said oil or said resin; said nonvolatile layer adhered to the applicator surface or applied thereto from a container;
    a protective cover overlying said nonvolatile layer and having an internal surface, said protective cover is such that the coating is not in contact with the internal surface of the cover from the time said nonvolatile layer is produced to the time that the wiper blade is installed on a vehicle to produce a hydrophobic film on the vehicle window surface with a water droplet contact angle of greater than or equal to 80° with the contact angle being measured by ASTM C813, the kit having a storage stability of greater than one month at an average temperature of between −50° C. and 120° C.; and
    instructions for contacting the applicator surface with the vehicle window surface to produce the hydrophobic film having a water contact angle of greater than or equal to 80°.

2. The kit of claim 1 wherein nonvolatile layer has a thickness of between 0.5 and 500 microns.

3. The kit of claim 1 wherein the nonvolatile layer is applied to both sides of a wiping lip of a rubber element of said applicator, said applicator is a wiper blade, and said nonvolatile layer is applied by spray, dip coating, or being brushed onto the rubber element in an amount ranging from 0.001 to 0.1 g per inch length per side.

4. The kit of claim 1 wherein said nonvolatile layer is non-drying and is transferrable from the applicator surface to the vehicle window surface by wiping.

5. The kit of claim 3 wherein the coated wiping lip of the rubber element causes the windshield to become hydrophobic after a number of wipe cycles either under dry, or wet, or combination of dry and wet condition.

6. The kit of claim 1 wherein the nonvolatile layer has a storage stability of greater than three months at an average temperature of −50 and 120° C.

7. The kit of claim 1 wherein said applicator is a wiper blade, and the vehicle window surface is a windshield.

8. The kit of claim 1 wherein said applicator is formed of at least material of chloroprene rubber, natural rubber, or silicone or any combination of them.

9. The kit of claim 8 wherein said applicator is coated with a friction coating prior to said nonvolatile layer being applied thereto.

10. The kit of claim 1 wherein said oil is only said silicone oil.

11. The kit of claim 1 wherein said oil is present from 1 to 95 total weight percent of said nonvolatile layer.

12. The kit of claim 1 wherein said resin is a silicone resin.

13. The kit of claim 1 wherein said resin is present from 0.1 to 80 total weight percent.

14. The kit of claim 1 wherein said particulate lubricant is selected from the group consisting of graphite, turbostratic carbon, boron nitride, boric acid, polytetrafluoroethylene (PTFE), molybdenum disulfide ($MoS_2$), and combinations thereof.

15. The kit of claim 1 wherein said particulate lubricant is present from 0.1 to 50 total solvated weight percent.

16. The kit of claim 1 further comprising a solvent in which said oil and said resins are dissolved.

* * * * *